Patented July 14, 1942

UNITED STATES PATENT OFFICE 2,289,546

CHLORONITROPARAFFINS AS INSECTICIDES

Hans Z. Lecher and Asa Willard Joyce, Plainfield, N. J., assignors to American Cyanamid Company, New York, N. Y., a corporation of Maine No Drawing. Application August 23, 1940, Serial No. 353,916

4 Claims. (Cl. 167—22)

This invention relates to insecticides and is concerned more particularly with a class of compounds adapted to the fumigation of enclosed spaces for the eradication of insects and allied pests.

We have discovered that valuable insecticidal properties are exhibited by the class of chloronitroparaffins of the general formula

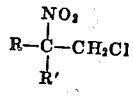

in which R and R' are selected from the group consisting of hydrogen, an alkyl radical containing less than six carbon atoms, and the $CH_2Cl$ radical. Typical examples of such compounds include 1-chloro-2-nitroethane, 1-chloro-2-nitropropane, 1-chloro-2-nitrobutane, 1-chloro-2-nitro-2-methyl propane, 1,3-dichloro-2-nitro-2-methyl propane, 1,3-dichloro-2-nitro-2-ethyl propane, tri(chloromethyl)-nitromethane, 1-chloro-2-nitro-4-methyl pentane, 1-chloro-2-nitrohexane, and 1-chloro-2-nitroheptane.

Many compounds of the above type are useful as fumigants.

A general method of preparing the above type of chloronitroparaffins consists in chlorinating the corresponding nitro-alkylols in the presence of pyridine using thionyl chloride as the chlorinating agent. The following examples describe the methods, the parts being parts by weight.

EXAMPLE 1

Preparation of 1-chloro-2-nitrobutane.—39.7 parts (0.33 mole) of 2-nitro-1-butanol are dissolved in 31.6 parts (0.4 mole) of pyridine in a vessel equipped with stirrer, thermometer, reflux condenser and dropping funnel. 47.6 parts (0.4 mole) of thionyl chloride are dropped in slowly while agitating the mixture. The temperature rises quickly to about 50° C. and is not allowed to rise above 55° C. during the addition. Upon warming to 70° C. a reaction sets in which raises the temperature to about 90° C., acid fumes being evolved. Heating at 80–85° C. is continued for 3 hours, the mixture is cooled and added to 200 parts of water. A dark heavy oil which separates is washed with aqueous soda solution. Carbon tetrachloride is added to the oil and the mixture obtained is distilled at ordinary pressure to remove the moisture (and the carbon tetrachloride). The remaining dry oil is then distilled under reduced pressure. The product having a pungent odor is obtained as a fraction boiling at 76–79° C. under a vacuum of about 14 mm.

EXAMPLE 2

Preparation of 1-chloro-2-nitro-2-methyl propane.—45.0 parts (0.378 mole) of 2-nitro-2-methyl propanol are dissolved in 31.6 parts (0.4 mole) of pyridine in a vessel equipped as in Example 1. 59.5 parts (0.5 mole) of thionyl chloride are added slowly to the mixture, the temperature rising from 25° to about 60° C. The reaction mixture is then heated to 90–95° C. for 3½ hours, cooled to 25° C. and added to 600 parts of water. A heavy oil separating out is washed with water, soda solution and again with water. 25 parts of carbon tetrachloride are added to the oil. The mixture is distilled at ordinary pressure to remove the moisture (and carbon tetrachloride). The remaining dry oil is then distilled under reduced pressure. The 1-chloro-2-nitro-2-methyl propane is collected in good yield as a fraction boiling at 68–69° C. at 15–16 mm.

EXAMPLE 3

1,3-dichloro-2-nitro-2-methyl propane is prepared using 67.5 parts (0.5 mole) of 2-nitro-2-methyl-1,3-propanediol, 95.0 parts (1.2 mole) of pyridine, 159.0 parts (1.33 mole) of thionyl chloride, and proceeding substantially as described in Example 2. The product is obtained in very good yield and has a boiling point of 92–94° C. at 16–18 mm.

EXAMPLE 4

Preparation of tri(chloromethyl)-nitromethane.—143.0 parts (1.2 mole) of thionyl chloride are slowly added to a mixture of 50.3 parts (0.33 mole) of tri-hydroxymethyl)-nitromethane and 87 parts (1.1 mole) of pyridine in a vessel equipped as in Example 1. The temperature gradually rises to about 50° C. The reaction mixture is stirred for one hour at 50° C., followed by refluxing at 100° C. for 2½ hours. After cooling to room temperature, 250 parts of water are added. The chloro derivative separates as a crystalline substance. It is filtered, washed with cold water, and recrystallized from alcohol. M. P. 100–102° C.

The fumigant, either alone or in admixture with others, is applied as for example by atomizing or vaporizing with or without heat into the enclosure a measured quantity of the material either at atmospheric pressure or at reduced air pressures. These compounds may also be introduced into the space to be fumigated, impregnated in absorbent bodies such as kieselguhr, cellulosic board, cloth and the like.

The invention will be illustrated in greater detail by the fumigation tests performed on various insects, listed in the following tables:

TABLE I

Fumigant: 1-chloro-2-nitrobutane

| Insect | Dosage | Exposure | Kill |
|---|---|---|---|
|  |  | Hours | Per cent |
| Rice weevil | 4 mg./liter | 4 | 67 |
| Do | 8 mg./liter | 4 | 100 |
| Do | 4 mg./liter | 24 | 100 |
| Do | Saturated vapors | 1 | 100 |
| Confused flour beetle | 8 mg./liter | 4 | 71 |
| Do | 12 mg./liter | 4 | 81 |
| Do | 4 mg./liter | 24 | 100 |
| Do | Saturated vapors | 2 | 100 |
| Roaches | 8 mg./liter | 4 | 100 |
| Do | 4 mg./liter | 24 | 100 |
| Do | Saturated vapors | ½ | 75 |
| Do | do | 1 | 100 |
| Black carpet beetle larvae | do | 2 | 70 |
| Do | do | 3 | 100 |
| Clothes moth larvae | do | 2 | 80 |
| Do | do | 3 | 100 |

TABLE II

Fumigant: 1-chloro-2-nitro-2-methyl propane

| Insect | Dosage | Exposure | Kill |
|---|---|---|---|
|  |  | Hours | Percent |
| Rice weevil | 4 mg./liter | 4 | 96 |
| Do | 8 mg./liter | 4 | 98 |
| Do | 12 mg./liter | 4 | 100 |
| Black carpet beetle larvae | 8 mg./liter | 24 | 50 |
| Do | 12 mg./liter | 24 | 70 |
| Clothes moth larvae | Saturated vapors | 24 | 60 |

TABLE III

Fumigant: 1,3-dichloro-2-nitro-2-methyl propane

| Insect | Dosage | Exposure | Kill |
|---|---|---|---|
|  |  | Hours | Percent |
| Rice weevil | Saturated vapors | 2 | 82 |
| Do | do | 4 | 98 |
| Do | do | 24 | 100 |
| Confused flour beetle | do | 4 | 81 |
| Do | do | 24 | 100 |
| Black carpet beetle larvae | do | 24 | 100 |
| Clothes moth larvae | 4 mg./liter | 4 | 80 |
| Do | Saturated vapors | 4 | 100 |

TABLE IV

Fumigant: tri(chloromethyl)-nitromethane

| Insect | Dosage | Exposure | Kill |
|---|---|---|---|
|  |  | Hours | Percent |
| Rice weevil | Saturated vapors | 48 | 98 |
| Roaches | do | 48 | 50 |

In the above tables where the dosage indicated is "saturated vapors," it is to be understood that the air in the fumigation vessel was saturated with the vapors of the fumigant.

From the above it is concluded that the entire class of chloronitroparaffins of the general formula set out exhibit valuable insecticidal properties.

While the invention has been described with particular reference to specific embodiments, it is to be understood that it is not to be limited thereto but is to be construed broadly and restricted solely by the scope of the appended claims.

We claim:

1. An insecticide including an effective amount of a compound of the general formula

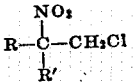

in which R and R' are selected from the group consisting of hydrogen, an alkyl radical containing less than six carbon atoms, and the CH₂Cl radical.

2. An insecticide including an effective amount of 1-chloro-2-nitrobutane.

3. An insecticide including an effective amount of 1-chloro-2-nitro-2-methyl propane.

4. An insecticide including an effective amount of 1,3-dichloro-2-nitro-2-methyl propane.

HANS Z. LECHER.
ASA WILLARD JOYCE.